March 21, 1961 W. L. CARLSON 2,975,682
BROACHING METHOD AND APPARATUS THEREFOR
Filed March 9, 1959 3 Sheets-Sheet 1

INVENTOR.
WILBUR L. CARLSON
BY
W. E. Finken
HIS ATTORNEY

March 21, 1961 W. L. CARLSON 2,975,682
BROACHING METHOD AND APPARATUS THEREFOR
Filed March 9, 1959 3 Sheets-Sheet 2

INVENTOR.
WILBUR L. CARLSON
BY
W. E. Finkin
HIS ATTORNEY

INVENTOR.
WILBUR L. CARLSON
BY
W. E. Finham
HIS ATTORNEY

United States Patent Office 2,975,682
Patented Mar. 21, 1961

2,975,682

BROACHING METHOD AND APPARATUS THEREFOR

Wilbur L. Carlson, Rochester, N.Y., assignor to General Motors Corporation, Detroit, Mich., a corporation of Delaware Filed Mar. 9, 1959, Ser. No. 798,052

7 Claims. (Cl. 90—93)

This invention pertains to the art of broaching, and particularly to an improved broaching method and apparatus for accomplishing the same.

There are numerous applications for duplicating parts in quantity by utilizing a broaching tool to finish holes with the desired accuracy. The present invention relates to a method and apparatus for broaching one surface of a single piece sheet metal motor frame of substantially rectangular configuration such as disclosed in copending application Serial No. 680,238, filed August 6, 1957, in the name of Simmons et al, and assigned to the assignee of this invention. As disclosed, the sheet metal frame has overlapping end portions secured together by spot welds and an opposite wall having a portion of arcuate configuration. Since a pole piece is attached to the overlapped end portions, it is necessary to machine the inner surface of the overlapped end portions so as to assure uniformity in the air gap between the pole piece and the arcuate opposing wall, and this machining can be most economically accomplished by a broaching process. Accordingly, among my objects are the provision of an improved broaching method; the further provision of a broaching method wherein the broach moves in a substantially rectilinear path; and the still further provision of apparatus for actuating a push broach in a rectilinear path such that the broach is forced through the motor frame, transferred to a return carrier and returned to its initial starting position without passing through the motor frame during a complete stroke of the press.

The aforementioned and other objects are accomplished in the present invention by utilizing a pair of broach carriers connected for movement in a parallel path, mechanism for transferring the broach from one carrier to the other carrier after completion of the broaching operation and means for automatically transferring the broach from the second carrier to the first carrier during the return stroke of the press. Specifically, the broach is formed with a plurality of cutting teeth along one surface and the opposite surface is of arcuate configuration so as to be guided by the arcuate surface of the motor frame. The upper end of the broach is formed with a pair of transversely extending grooves and a notch. The carriers are formed with inwardly projecting rails and embody spring loaded detents engageable with the notch in the broach for retaining the broach in proper alignment with the carriers. The motor frame is suitably supported on the bed of the machine in alignment with one of the carriers. The carriers are interconnected for simultaneous movement, with the second carrier being spaced from the first carrier and in alignment therewith.

A fluid pressure operated servo motor is mounted on the bed and comprises a cylinder having a reciprocable piston therein, the piston having a rod extending outside of the cylinder. After the broach has been pushed through the frame, the transfer servo motor is actuated and transfers the broach from the working carrier to the return carrier. A vertically upstanding cam track is mounted on the bed, and receives a roller type cam follower carried by a return transfer mechanism. As the carriers are moved to their initial starting position, the cam operated transfer mechanism moves the broach from the return carrier to the working carrier so that the apparatus is ready to perform another broaching operation when another motor frame is placed in the work supporting fixture of the machine.

The steps involved in the improved broaching method comprise pushing the broach through the motor frame; transferring the broach from the working carrier to the return carrier; returning the carriers to their initial starting positions and transferring the broach from the return carrier to the working carrier. By following this method, the broach is returned externally of the work and is automatically repositioned in alignment with the work at the end of the return stroke of the press.

Further objects and advantages of the present invention will be apparent from the following description, reference being had to the accompanying drawings, wherein a preferred embodiment of the present invention is clearly shown.

Figure 1:
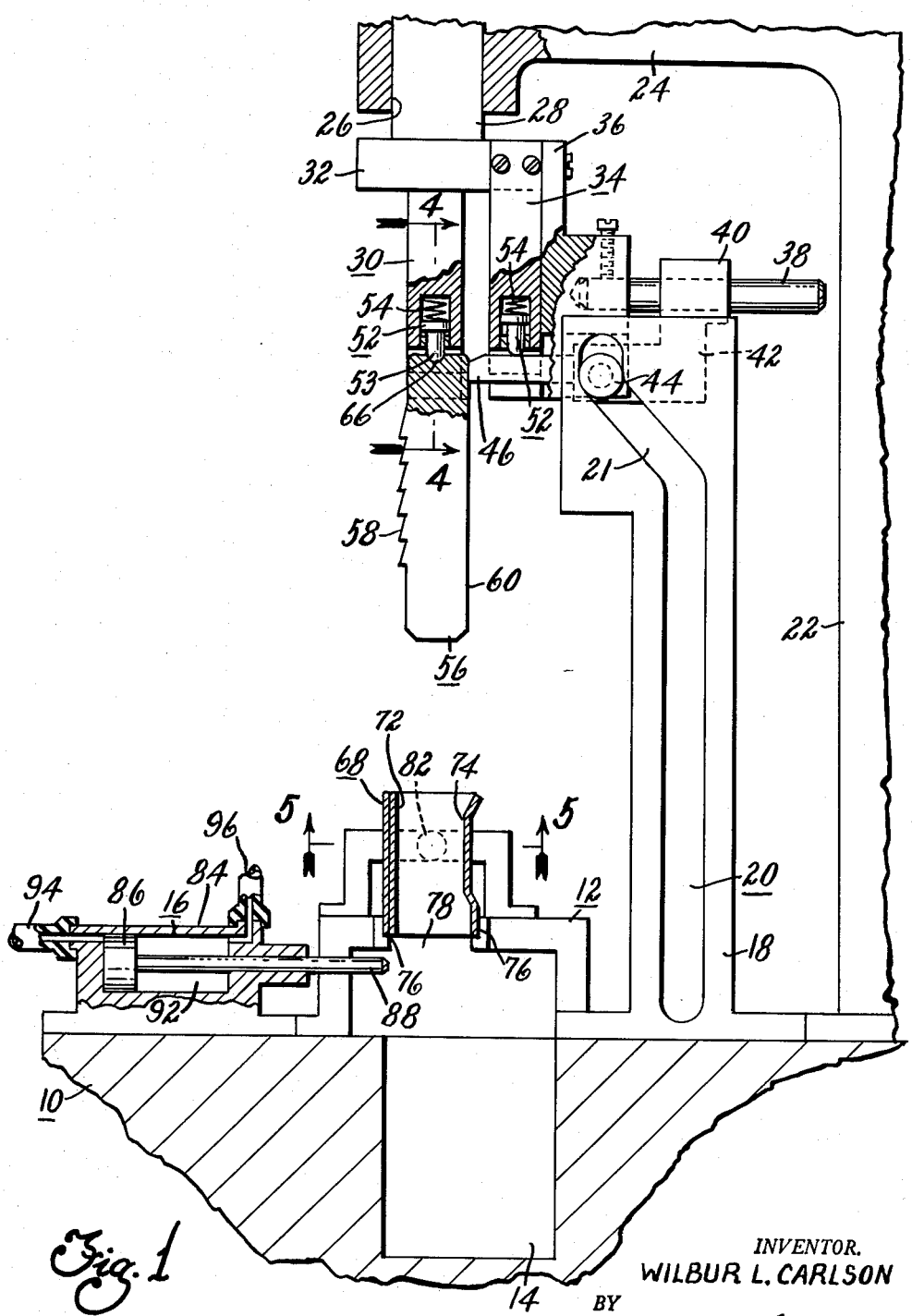
Figure 1 is a fragmentary view, partly in section and partly in elevation, of the apparatus constructed according to the present invention.

With particular reference to Figure 1, the improved broaching apparatus includes a bed 10 having a work supporting fixture 12 attached thereto over a recess 14 in the bed. A servo motor 16 is attached to the bed 10 on one side of the work supporting fixture 12, and an upright standard 18 having a cam track 20 is attached to the bed 10 on the other side of the work supporting fixture 12. A second upright standard 22 is suitably attached to the machine bed 10, the upright standard 22 having a transversely extending member 24 with a guide opening 26 through which a rod 28 of a suitable press, not shown, extends.

The rod 28 is suitably attached to a working carrier 30 by means of a flanged coupling 32. A return carrier 34 laterally spaced from but in alignment with the working carrier 30 is suitably attached to the flanged coupling 32. A guide member 36 is also attached to the flanged coupling 32 and carries a transversely extending rod 38 which slidably supports a collar 40. The collar 40 is integral with a bracket 42 on which a cam follower roller 44 is suitably journalled. The cam follower roller 44 is disposed within the cam track 20 of the upright standard 18. A transfer pin 46 is suitably connected with the bracket 42, such that during transverse movement of the bracket 42 caused by movement of the follower 44 through the inclined portion 21 of the cam track 20, the pin 46 will move transversely from the position shown in Figure 2 to the position shown in Figure 1.

Figure 4:
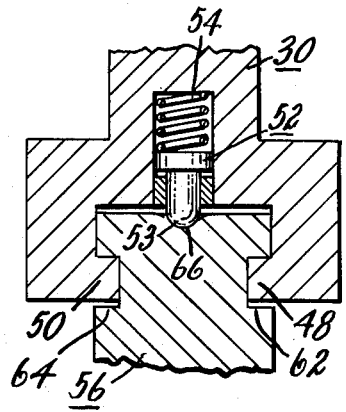
Figure 4 is an enlarged fragmentary sectional view of the broach and carrier assembly taken along line 4—4 of Figure 1.

With reference to Figure 4, the carriers 30 and 34 are of identical construction, and thus a description of one is deemed to be sufficient. The carrier 30 has a pair of inwardly extending rail portions 48 and 50, and a centrally located detent pin 52 resiliently biased outwardly by a spring 54. The detent pin has a hemispherical end portion 53. The carriers 30 and 34 are adapted to receive a broach 56 having a graduated series of teeth 58 along one edge and an arcuate surface 60 opposite the teeth 58. As seen in Figure 4, the upper end of the broach 56 is formed with a pair of transversely extending grooves 62 and 64 and a centrally located hemispherical notch 66. The grooves 62 and 64 are adapted to receive the rails, or tongues, 48 and 50, respectively, in the carriers 30 and 34. When the broach 56 is properly mounted in the carrier, the end 53 of the detent pin 52 engages the notch 66.

Figure 5:
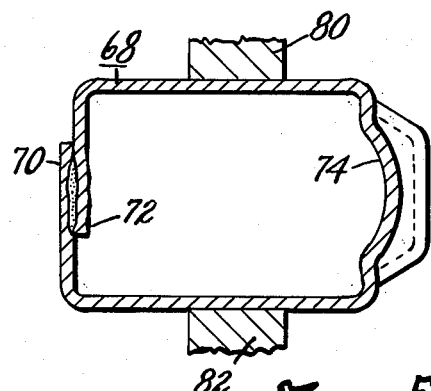
Figure 5 is an enlarged sectional view of the rectangular motor frame and supporting fixture taken along line 5—5 of Figure 1.

With reference to Figure 5, the article to be broached comprises a single piece sheet metal rectangular motor frame 68 having overlapped end portions 70 and 72 secured together by spot welds. The wall of the motor frame 68 opposite the overlapped end portions has an intermediate portion of arcuate configuration as indicated by numeral 74 constituting a guide surface for the arcuate surface 60 of the broach 56. The inner surface of the end portion 72 of the motor frame must be finished by the broach 56 so that the distance between the arcuate surface 74 and the inner surface of the end portion 72 is within predetermined limits.

The motor frame 68 is rigidly supported in the fixture 12 with one end thereof engaging a shoulder 76 formed around the periphery of a central opening 78 in the fixture 12. The side walls of the motor frame 68 are supported by pads 80 and 82 as indicated in Figure 5. The motor frame 68 is supported by the fixture 12 in alignment with the working carrier 30 such that upon downward movement of the press rod 28 from the position of Figure 1 to the position of Figure 2, the broach 56 will be pushed through the frame 68 to finish the inner surface of the end portion 72.

The transfer servo motor 16 includes a cylinder 84 having a reciprocable piston 86 disposed therein. The piston 86 has a rod 88 extending outside of the cylinder in substantial alignment with the longitudinal axes of the carriers 30 and 34. The piston 86 divides the cylinder 84 into opposed chambers 90 and 92. The chamber 90 is connected to conduit 94 and the chamber 92 is connected to a conduit 96 which can be connected alternately to pressure and drain.

Figure 2:
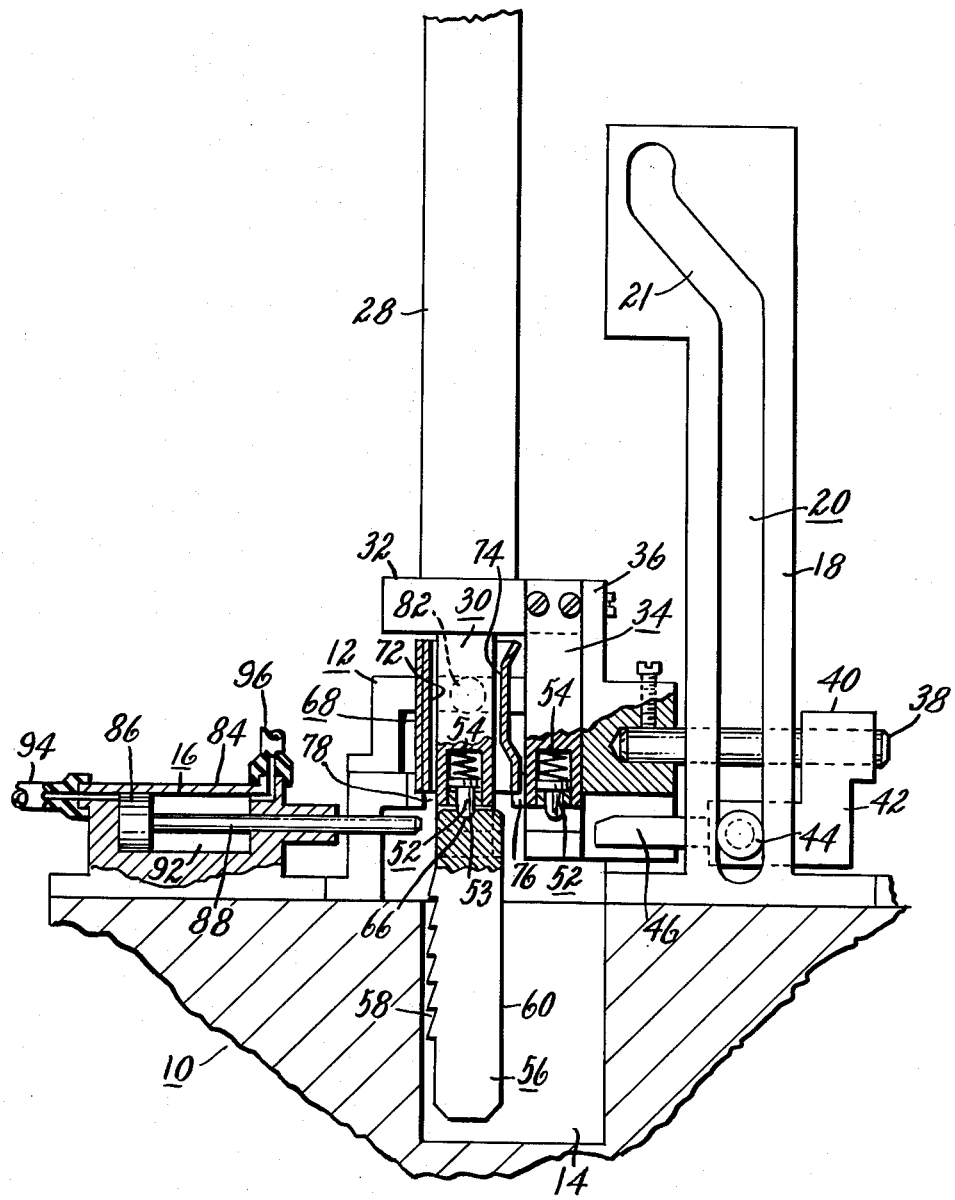
Figure 2 is a fragmentary view, partly in section and partly in elevation, depicting the position of the broach after completion of the broaching operation.
Figure 3:
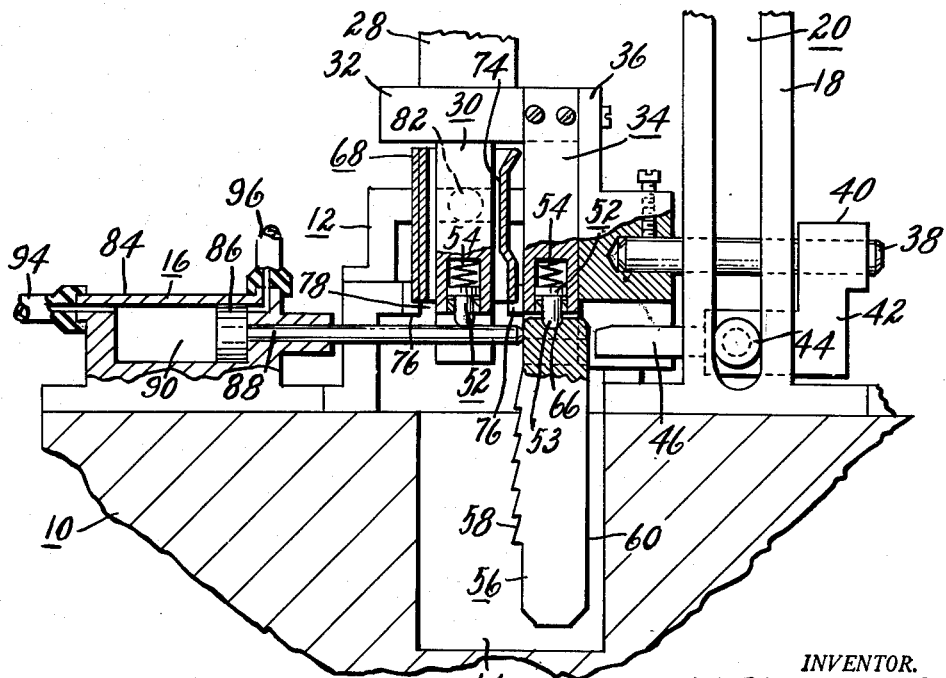
Figure 3 is a fragmentary view, partly in section and partly in elevation, depicting the broach transferred to the return carrier.

During the working stroke of the broach 56, the chamber 92 is pressurized and the chamber 90 is connected to drain so as to maintain the piston 86 in the left hand position as shown in Figure 1. After the broach 56 has been pushed through the frame 68 so as to be disposed within the recess 14, as shown in Figure 2, the chamber 90 is pressurized and the chamber 92 is connected to drain so as to move the piston 86 from the position of Figure 2 to the position of Figure 3. During movement of the piston 86, the end of the rod 88 engages the broach 56 and effects transverse movement of the broach 56 from the working carrier 30 to the return carrier 34. Thereafter, the cylinder chamber 92 is again pressurized and the chamber 90 is connected to drain to move the piston 86 back to the position of Figure 1. On the return stroke of the press rod 28, the broach 56 is moved upwardly by the carrier 34 externally of the motor frame 68. As the follower roller moves to engage the inclined portion 21 of the cam track 20, the bracket 42 and the transfer pin 46 move transversely to the left, as viewed in Figure 3, so that when the return stroke of the press rod 28 is completed, the pin 46 will have transferred the broach 56 from the return carrier 34 to the working carrier 30. The operator can now remove the finished frame 68 from the fixture 12 and insert an unbroached frame therein after which another broaching cycle can be initiated.

From the foregoing it is apparent that the present invention provides a broaching method wherein the broach is transferred from a working carrier to a return carrier after completion of the broaching operation, and is automatically transferred from the return carrier to the working carrier during the return stroke of the press so that the broach does not have to be returned through the work. The disclosed apparatus embodies a servo mechanism to transfer the broach from the working carrier to the return carrier after completion of the broaching operation, cam actuated means to automatically transfer the broach from the return carrier to the working carrier, and detent means to assure proper alignment of the broach with the carriers.

While the embodiment of the invention as herein disclosed constitutes a preferred form, it is to be understood that other forms might be adopted.

What is claimed is as follows:

1. Broaching apparatus including, a fixture for supporting an article, a pair of reciprocable carriers connected for simultaneous linear movement in a parallel path, a broach connectible with either of said carriers, one of said carriers being aligned with said article and the other of the carriers being laterally spaced from said article, reciprocable means operable to actuate said carriers to move said broach through said article, means operable to transfer said broach from said one carrier to the other carrier after the broach has been moved through said article, and means operable to transfer the broach from said other carrier to said one carrier during the return stroke of said reciprocable actuating means.

2. Broaching apparatus including, a fixture for supporting an article, a pair of reciprocable carriers connected for simultaneous linear movement in a parallel path, a broach, said broach and said carriers having complementary tongue and groove portions whereby the broach can be connected with either of said carriers, one of said carriers being aligned with said article and the other of the carriers being laterally spaced therefrom, means operable to actuate said carriers to push said broach through said article, reciprocable means operable to transfer said broach from said one carrier to said other carrier after the broach has been moved through said article, and means operable to transfer the broach from said other carrier to said one carrier during the return stroke of said reciprocable actuating means.

3. Broaching apparatus including, a substantially horizontal fixture for supporting an article, a pair of reciprocable carriers connected for simultaneous vertical movement relative to said article, one of said carriers being aligned with said article and the other of said carriers being laterally spaced therefrom, a broach connectible with either of said carriers whereby when said broach is connected to said one carrier said broach will be moved through said article during vertical movement of said carriers in one direction, means operable to transfer said broach from said one carrier to said other carrier prior to vertical movement of said carriers in the opposite direction whereby said broach will be returned externally of said article, and means operable to transfer said broach from said other carrier to said one carrier during the return movement thereof.

4. The broaching apparatus set forth in claim 3 wherein said carriers and said broach have complementary tongue and groove portions, and wherein each carrier includes spring biased detent means for locking the broach in alignment therewith.

5. The broaching apparatus set forth in claim 3 wherein the means operable to transfer said broach from said one carrier to said other carrier comprises a fluid pressure operated servo motor.

6. The broaching apparatus set forth in claim 3 wherein the means operable to move the broach from said other carrier to said one carrier comprises a cam actuated transfer mechanism.

7. The broaching apparatus set forth in claim 6 wherein said cam actuated transfer mechanism comprises a stationary cam track, a transfer pin connected for movement with said carriers and adapted for transverse movement relative thereto, and a cam follower operatively connected with said transfer pin and engaging said stationary cam track.

References Cited in the file of this patent

UNITED STATES PATENTS

| | | |
|---|---|---|
| 1,218,426 | Lockley | Mar. 6, 1917 |
| 1,932,425 | Stainfield | Oct. 31, 1933 |
| 2,165,588 | Thompson | July 11, 1939 |
| 2,319,206 | Bush | May 18, 1943 |